United States Patent
Kajimura et al.

(10) Patent No.: US 12,260,515 B2
(45) Date of Patent: Mar. 25, 2025

(54) IMAGE PROCESSING DEVICE, IMAGE PROCESSING METHOD, AND IMAGE PROCESSING PROGRAM

(71) Applicant: OLYMPUS CORPORATION, Hachioji (JP)

(72) Inventors: Kosuke Kajimura, Tokyo (JP); Ryosuke Mochizuki, Tokyo (JP); Kenichi Onomura, Tokyo (JP); Eiji Furukawa, Saitama (JP)

(73) Assignee: OLYMPUS CORPORATION, Tokyo (JP)

( * ) Notice: Subject to any disclaimer, the term of this patent is extended or adjusted under 35 U.S.C. 154(b) by 426 days.

(21) Appl. No.: 17/709,616

(22) Filed: Mar. 31, 2022

(65) Prior Publication Data
US 2022/0222777 A1    Jul. 14, 2022

Related U.S. Application Data

(63) Continuation of application No. PCT/JP2020/001860, filed on Jan. 21, 2020.

(51) Int. Cl.
*G06T 3/4053* (2024.01)
*G06T 5/50* (2006.01)

(52) U.S. Cl.
CPC .............. *G06T 3/4053* (2013.01); *G06T 5/50* (2013.01); *G06T 2207/10028* (2013.01); *G06T 2207/20221* (2013.01)

(58) Field of Classification Search
CPC . G06T 2207/10028; G06T 2207/20221; G06T 3/4053; G06T 5/50; G06T 5/73;
(Continued)

(56) References Cited

U.S. PATENT DOCUMENTS

2009/0153683 A1  6/2009  Furukawa
2009/0213235 A1  8/2009  Watanabe
(Continued)

FOREIGN PATENT DOCUMENTS

EP    2063628 A1    5/2009
JP    2006-92450    *  5/2006
(Continued)

OTHER PUBLICATIONS

Elizabeth (2016) Understanding depth of field—A beginner's guide, Photography Life. Available at: https://photographylife.com/what-is-depth-of-field#:~:text=Depth%20of%20field%20is%20the,sharp'%20is%20a%20loose%20one! (Accessed: Jul. 18, 2024). (Year: 2016).*

(Continued)

*Primary Examiner* — Sean M Conner
*Assistant Examiner* — Stefano Anthony Dardano
(74) *Attorney, Agent, or Firm* — Holtz, Holtz & Volek PC

(57) ABSTRACT

An image processing device combines a plurality of time-series images to generate a composite image with a higher resolution than a resolution of the plurality of images. The image processing device includes a processor that includes hardware and that is configured to: detect depth information of at least one image of the plurality of images; and set the number of images to be combined for generating the composite image on the basis of the detected depth information. The depth information indicates a depth of a captured scene of the at least one image. The processor is configured to reduce the number of images as the depth of the captured scene increases.

12 Claims, 4 Drawing Sheets

(58) Field of Classification Search
CPC . G06T 2207/20201; G06T 2207/10004; G06T 2207/20212; G06T 5/70
See application file for complete search history.

(56) References Cited

U.S. PATENT DOCUMENTS

| | | | |
|---|---|---|---|
| 2011/0128440 A1 | 6/2011 | Koike | |
| 2013/0202161 A1* | 8/2013 | Shor | G06V 40/16 382/118 |
| 2015/0279012 A1* | 10/2015 | Brown | G06T 5/50 382/284 |
| 2019/0208122 A1 | 7/2019 | Okazawa | |

FOREIGN PATENT DOCUMENTS

| | | |
|---|---|---|
| JP | 2007133810 A | 5/2007 |
| JP | 2008067315 A | 3/2008 |
| JP | 2009206628 A | 9/2009 |
| JP | 2011022805 A | 2/2011 |
| JP | 2011139428 A | 7/2011 |
| JP | 2016181023 A | 10/2016 |
| WO | 2016152358 A1 | 9/2016 |
| WO | 2018066027 A1 | 4/2018 |

OTHER PUBLICATIONS

International Search Report (ISR) (and English language translation thereof) dated Apr. 14, 2020, issued in International Application No. PCT/JP2020/001860.
Ono, et al., "Depth-Adapted Super-Resolution Technology to Achieve Depth Recovery of Images", Toshiba review, vol. 68, No. 2, pp. 28-31, p. 28 1, p. 30 3. 2.

* cited by examiner

IMAGE PROCESSING DEVICE, IMAGE PROCESSING METHOD, AND IMAGE PROCESSING PROGRAM

CROSS-REFERENCE TO RELATED APPLICATIONS

This is a continuation of International Application PCT/JP2020/001860 which is hereby incorporated by reference herein in its entirety.

TECHNICAL FIELD

The present invention relates to image processing devices, image processing methods, and image processing programs.

BACKGROUND ART

Known technology in the related art involves using a plurality of time-series images to generate a composite image with higher a resolution than the resolution of the plurality of images (for example, see Patent Literature 1). In Patent Literature 1, a high-resolution composite image is generated by using a predetermined number of frames selected from the frames of a moving image. In order to achieve high resolution, there needs to be misalignment of a subject between the images used for generating the composite image. In Patent Literature 1, the interval between the selected frames is set such that the amount of misalignment between the images is equal to a predetermined amount of misalignment.

CITATION LIST

Patent Literature

{PTL 1}
Japanese Unexamined Patent Application, Publication No. 2016-181023

SUMMARY OF INVENTION

An aspect of the present invention provides an image processing device that combines a plurality of time-series images to generate a composite image with a higher resolution than a resolution of the plurality of images. The image processing device includes a processor that includes hardware and that is configured to: detect depth information of at least one image of the plurality of images; and set the number of images to be combined for generating the composite image on the basis of the detected depth information. The depth information indicates a depth of a captured scene of the at least one image. The processor is configured to reduce the number of images as the depth of the captured scene increases.

Another aspect of the present invention provides an image processing method for combining a plurality of time-series images to generate a composite image with a higher resolution than a resolution of the plurality of images. The image processing method includes: detecting depth information of at least one image of the plurality of images; and setting the number of images to be combined for generating the composite image on the basis of the detected depth information. The depth information indicates a depth of a captured scene of the at least one image. In the setting, the number of images is reduced as the depth of the captured scene increases.

Another aspect of the present invention provides a non-transitory computer-readable medium having an image processing program stored therein. The program is for causing a processor to execute image processing for combining a plurality of time-series images to generate a composite image with a higher resolution than a resolution of the plurality of images. The program causes the processor to execute functions of: detecting depth information of at least one image of the plurality of images; and setting the number of images to be combined for generating the composite image on the basis of the detected depth information. The depth information indicates a depth of a captured scene of the at least one image. In the setting, the number of images is reduced as the depth of the captured scene increases.

DESCRIPTION OF EMBODIMENTS

First Embodiment

An image processing device 1, an imaging apparatus 10, an image processing method, and an image processing program according to a first embodiment of the present invention will now be described with reference to the drawings.

Figure 1:
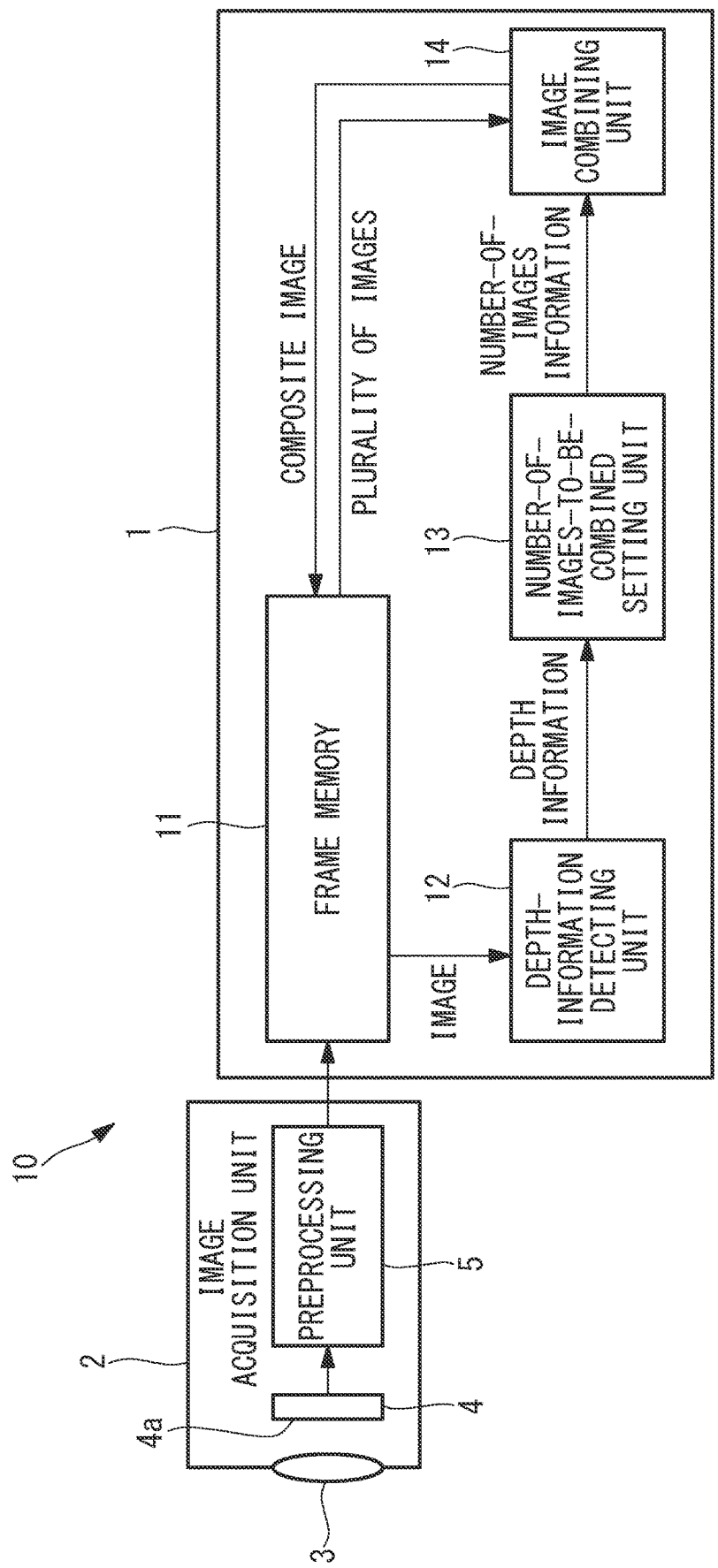
FIG. 1 illustrates the overall configuration of an image processing device and an imaging apparatus according to a first embodiment of the present invention.

The imaging apparatus 10 is, for example, a digital camera that captures and records a still image or a moving image. As shown in FIG. 1, the imaging apparatus 10 includes an image acquisition unit 2 and the image processing device 1.

The image acquisition unit 2 captures an image of a subject and loads the captured image. In detail, the image acquisition unit 2 includes an optical system 3 that collects light from the subject, an imaging element 4 that captures an image of the light collected by the optical system 3, and a preprocessing unit 5. The optical system 3 has an imaging lens including at least one lens, and forms an optical image of the subject on an imaging surface 4a of the imaging element 4. The image acquisition unit 2 causes the imaging element 4 to perform a continuous shooting mode so as to acquire a plurality of time-series images. During the continuous shooting mode, the imaging element 4 shifts in a direction parallel to the imaging surface 4a in accordance with shaking of the imaging apparatus 10 or actuation of a shifting mechanism provided in the image acquisition unit 2. Thus, misalignment of the subject occurs between the plurality of time-series images. The plurality of images each undergo preprocessing, such as a correction, performed by the preprocessing unit 5, and are subsequently stored in a frame memory 11 of the image processing device 1.

The image processing device 1 processes the plurality of images loaded by the image acquisition unit 2 and generates a composite image with a higher resolution than the resolution of each of the plurality of images. The plurality of time-series images will be referred to as "low-resolution images" hereinafter. The image processing device 1 includes the frame memory 11, a depth-information detecting unit 12, a number-of-images-to-be-combined setting unit 13, and an image combining unit 14.

The image processing device 1 includes a processor (not shown), such as a CPU, and a storage unit (not shown) having a RAM, a ROM, and other freely-chosen storage devices. The storage unit has an image processing program stored therein. The processor executes a process in accordance with the image processing program, so that processes of the units 12, 13, and 14 to be described below are implemented.

Alternatively, the functions of the units 12, 13, and 14 to be described below may be implemented by dedicated circuits for the respective functions.

The depth-information detecting unit 12 reads at least one of the plurality of time-series low-resolution images from the frame memory 11 and detects depth information of the at least one low-resolution image. For example, the depth-information detecting unit 12 reads a first one of the plurality of time-series low-resolution images from the frame memory 11 and detects depth information of the first low-resolution image.

Figure 2:
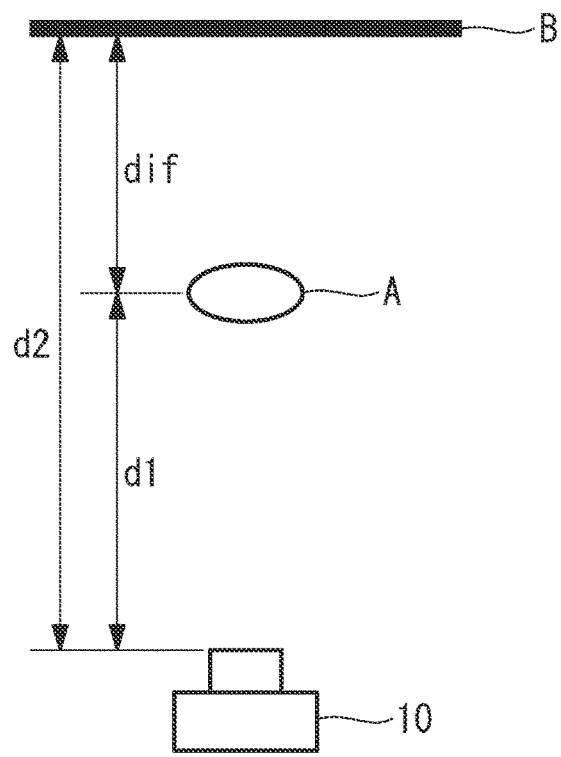
FIG. 2 illustrates depth information of a low-resolution image.

FIG. 2 illustrates an example of a depth-information detection method. The depth information indicates the depth of a captured scene of a low-resolution image. In this embodiment, the depth-information detecting unit 12 detects a subject distance difference dif, indicating the difference between a closest distance d1 and a farthest distance d2, as the depth information. The closest distance d1 is the subject distance from the imaging apparatus 10 to a subject A located closest to the imaging apparatus 10 among subjects in the first low-resolution image. The farthest distance d2 is the subject distance from the imaging apparatus 10 to a subject B located farthest from the imaging apparatus 10 among the subjects in the first low-resolution image.

For detecting the subject distance difference dif, the imaging apparatus 10 includes a distance detector that detects the subject distances d1 and d2 to the respective subjects A and B. One example of the distance detector is an image-surface phase-difference sensor provided in the image acquisition unit 2. Another example of the distance detector is an image analyzer that analyzes each of the frames of a live-view image acquired by the imaging apparatus 10 prior to a continuous shooting mode and that calculates the amount of motion for each region within the frame.

The low-resolution image to be used by the depth-information detecting unit 12 for detecting the depth information is not limited to the first low-resolution image. For example, the depth-information detecting unit 12 may detect the depth information of one freely-chosen low-resolution image other than the first low-resolution image. Alternatively, the depth-information detecting unit 12 may detect the depth information from two or more low-resolution images. For example, the depth-information detecting unit 12 may calculate subject distance differences of the two of more low-resolution images and detect an average value of the calculated subject distance differences as an ultimate subject distance difference dif.

The number-of-images-to-be-combined setting unit 13 sets the number of images to be combined on the basis of the subject distance difference dif detected by the depth-information detecting unit 12. The number of images to be combined is the number of low-resolution images to be used for generating a composite image. The number-of-images-to-be-combined setting unit 13 reduces the number of images to be combined as the subject distance difference dif increases.

Figure 3:
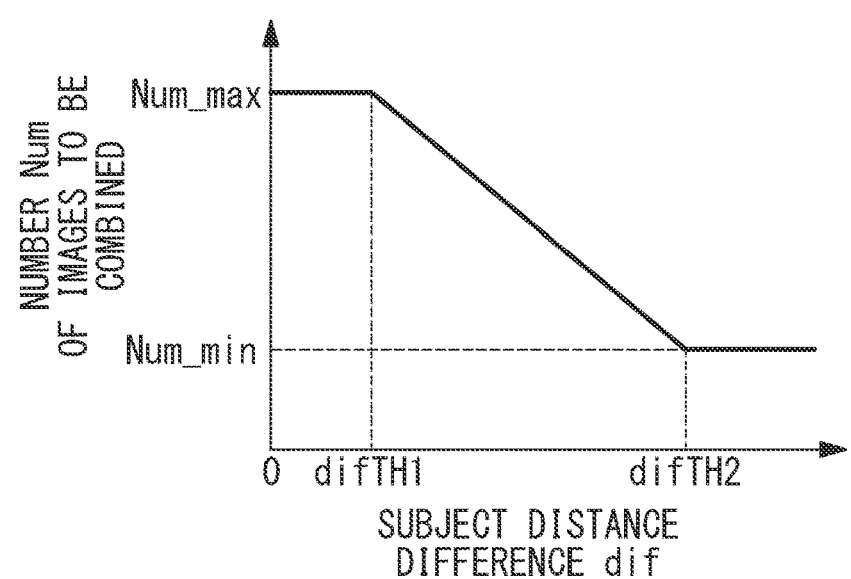
FIG. 3 illustrates an example of a method performed by a number-of-images-to-be-combined setting unit for setting the number of images to be combined.

FIG. 3 illustrates an example of a method performed by the number-of-images-to-be-combined setting unit 13 for setting the number Num of images to be combined. In the example in FIG. 3, the number of images to be combined is to be changed between a minimum value Num_min and a maximum value Num_max in accordance with the subject distance difference dif.

If the subject distance difference dif is smaller than or equal to a threshold value difTH1, the number of images to be combined is the maximum value Num_max. The maximum value Num_max indicates, for example, the number of time-series low-resolution images acquired by the image acquisition unit 2.

If the subject distance difference dif is larger than or equal to a threshold value difTH2, the number of images to be combined is the minimum value Num_min. The threshold value difTH2 is larger than the threshold value difTH1. The minimum value Num_min is larger than 2 and smaller than the maximum value Num_max.

If the subject distance difference dif is larger than the threshold value difTH1 and smaller than the threshold value difTH2, the number of images to be combined decreases as the subject distance difference dif increases.

The relationship between the subject distance difference dif and the number Num of images to be combined shown in FIG. 3 is merely an example. The relationship between the subject distance difference dif and the number Num of images to be combined may be arbitrarily set so long as the relationship in which the number Num of images to be combined decreases with increasing subject distance difference dif is satisfied.

For example, a single threshold value difTH2 may be set, and the number Num of images to be combined may decrease continuously from the maximum value Num_max to the minimum value Num_min as the subject distance difference dif increases from 0 to the threshold value difTH2. Alternatively, three or more threshold values may be set, and the number Num of images to be combined may change in a stepwise fashion as the subject distance difference dif increases.

The image combining unit 14 reads, from the frame memory 11, low-resolution images, of the plurality of time-series low-resolution images, equal in number to the number of images to be combined set by the number-of-images-to-be-combined setting unit 13. Subsequently, on the basis of the amount of misalignment of each subject between the low-resolution images, the image combining unit 14 positionally adjusts the pixels in the low-resolution images in a high-resolution-image space and combines the low-resolution images, thereby generating a composite image. The high-resolution-image space is a two-dimensional space having a higher resolution than each low-resolution image. The generated composite image is stored in the frame memory 11.

The amount of misalignment of each subject between the low-resolution images is detected from, for example, the amount of global or local motion between the low-resolution images. Alternatively, if the plurality of time-series low-resolution images are to be acquired by the imaging element 4 while the imaging element 4 is being shifted by the shifting mechanism provided in the image acquisition unit 2, the amount of misalignment is detected from the shifting direction and the shifting amount of the imaging element 4 by the shifting mechanism.

The following description relates to the relationship between the subject distance difference dif in the low-resolution images and an artifact in the composite image.

In order to generate an artifact-free composite image from the plurality of low-resolution images, each subject needs to be positionally adjusted properly in the positional adjustment of the plurality of low-resolution images.

If the captured scene of the low-resolution images has depth, the amount of misalignment of each subject between the low-resolution images varies from depth to depth. In the case of the example in FIG. 2, the amount of misalignment of the subject A at the front is larger than the amount of misalignment of the subject B at the back. Therefore, in the positional adjustment of the plurality of low-resolution images, a positional adjustment error occurs in the subjects A and B due to the difference in the amount of misalignment from depth to depth, thus causing an artifact to occur in the composite image due to the positional adjustment error.

If the subject distance difference dif is smaller than the threshold value difTH1, the difference in the amount of misalignment of each of the subjects A and B from depth to depth is small to an extent that it does not have an effect on an occurrence of an artifact in the composite image. Therefore, a composite image having few to no artifacts can be generated from the maximum number Num_max of low-resolution images.

On the other hand, if the subject distance difference dif is larger than the threshold value difTH1, the difference in the amount of misalignment of each of the subjects A and B from depth to depth has an effect on an occurrence of an artifact in the composite image. In this case, a larger number of positional adjustment errors are accumulated as the number of low-resolution images to be combined increases, so that deterioration in the resolution and an artifact, like a ghost, become more noticeable. Thus, the number of images to be combined is reduced as the subject distance difference dif increases, so that an occurrence of an artifact caused by an accumulation of positional adjustment errors can be suppressed, whereby a composite image having few artifacts can be generated.

Figure 4:
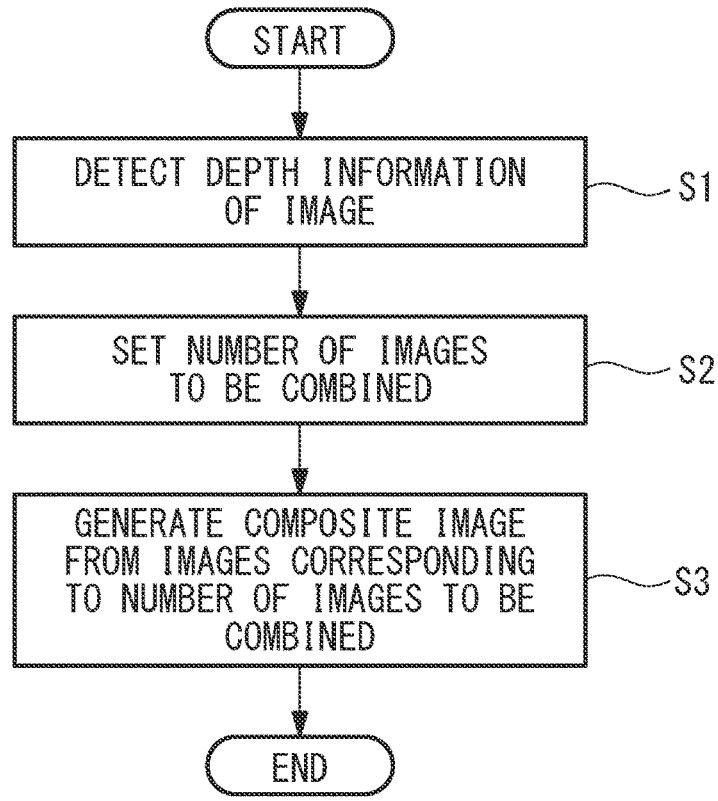
FIG. 4 is a flowchart illustrating an image processing method performed by the image processing device in FIG. 1.

Next, an image processing method performed by the image processing device 1 will be described with reference to FIG. 4.

The image processing method according to this embodiment includes step S1 for detecting depth information of at least one of a plurality of time-series low-resolution images acquired by the image acquisition unit 2, step S2 for setting the number of low-resolution images to be combined for generating a composite image on the basis of the detected depth information, and step S3 for generating a composite image by combining the low-resolution images corresponding to the set number of images to be combined.

In step S1, when the plurality of time-series low-resolution images are stored in the frame memory 11, the depth-information detecting unit 12 reads at least one low-resolution image, such as the first low-resolution image, from the frame memory 11. Then, the depth-information detecting unit 12 detects the subject distance difference dif of the read low-resolution image as depth information.

Then, in step S2, the number-of-images-to-be-combined setting unit 13 sets the number of low-resolution images to be combined on the basis of the subject distance difference dif. The number of images to be combined decreases as the subject distance difference dif increases.

Subsequently, in step S3, the image combining unit 14 reads, from the frame memory 11, the low-resolution images, of the plurality of time-series low-resolution images, corresponding to the number of images to be combined set in step S2 and combines the read low-resolution images, thereby generating a composite image.

Accordingly, in this embodiment, the number of images to be combined is set in accordance with the subject distance difference dif, between the subjects A and B, indicating the depth of the captured scene of the low-resolution images, and the number of images to be combined is reduced as the depth of the captured scene increases. Consequently, even when the depth of the captured scene is large, a composite image having few artifacts can be generated.

An artifact in a composite image caused by the difference in the amount of misalignment of each subject from depth to depth can also be reduced by using the technique in the related art. The image processing device 1 and the image processing method according to this embodiment are advantageous over the technique in the related art in that the calculation cost can be reduced and an artifact can be effectively reduced.

In detail, by detecting the amount of misalignment between the plurality of low-resolution images for each pixel and positionally adjusting the pixels in the low-resolution images on the basis of the detected amount of misalignment, a positional adjustment can be properly performed on each subject located at the same depth. However, in this case, the amount of misalignment has to be calculated with high accuracy for each pixel, thus requiring an enormous calculation cost. In contrast, this embodiment simply requires the detection of the depth information of at least one of the low-resolution images and the calculation of the number of images to be combined, so that an artifact can be reduced in the composite image.

One method that requires a low calculation cost is a block matching method in which a plurality of discrete measurement regions are set within a low-resolution image and the amount of misalignment is detected for each measurement region. However, in this case, since a plurality of subjects located at different depths may possibly be mixed within a single measurement region, the amount of misalignment to be calculated may contain an error. Thus, it is difficult to generate a composite image having few artifacts.

If a geometric deformation of a low-resolution image is to be estimated (i.e., if a projection transform matrix is to be estimated) by using the amount of misalignment in a plurality of measurement regions, the projection transform matrix is calculated by using the amount of misalignment containing an error. Therefore, it is difficult to generate a composite image having few artifacts.

Second Embodiment

Next, an image processing device 1, an imaging apparatus 10, an image processing method, and an image processing program according to a second embodiment of the present invention will be described with reference to the drawings.

In this embodiment, components that are different from those in the first embodiment will be described, whereas components identical to those in the first embodiment will be given the same reference signs, and descriptions thereof will be omitted.

The image processing device 1 and the imaging apparatus 10 according to this embodiment are different from those in the first embodiment in that the number-of-images-to-be-combined setting unit 13 sets the number Num of images to be combined on the bias of the closest distance d1 in addition to the subject distance difference dif.

Figure 5:
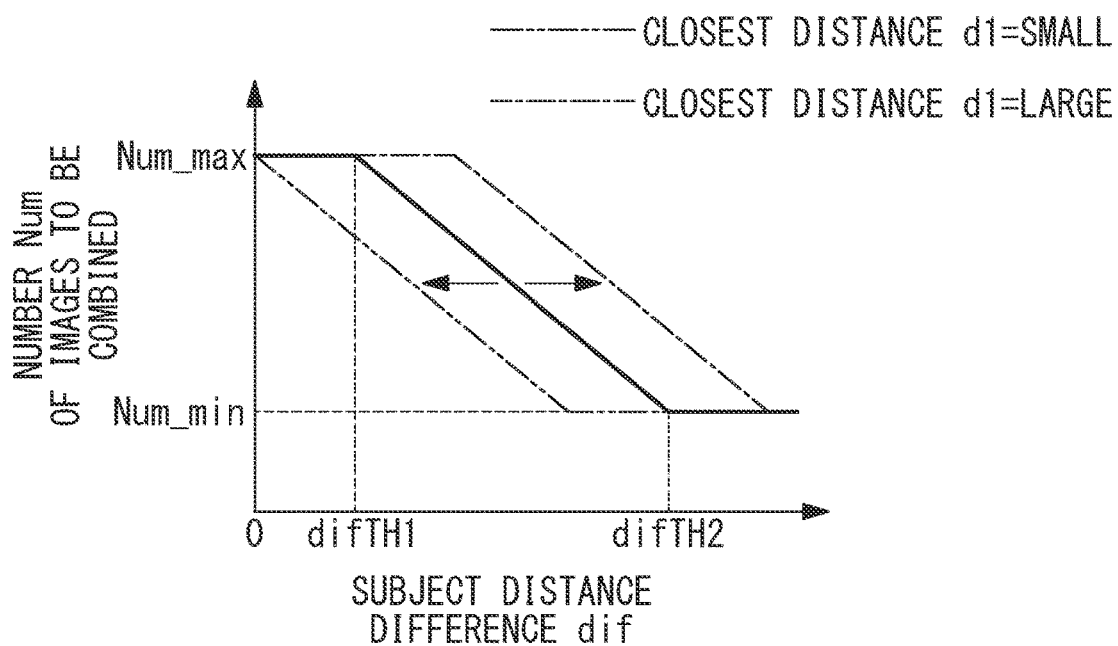
FIG. 5 illustrates an example of a method performed by a number-of-images-to-be-combined setting unit of an image processing device according to a second embodiment of the present invention for setting the number of images to be combined.

As shown in FIG. 5, the number-of-images-to-be-combined setting unit 13 controls the threshold values difTH1 and difTH2 for the subject distance difference dif in accordance with the closest distance d1, and reduces the threshold values difTH1 and difTH2 as the closest distance d1 decreases. Specifically, in FIG. 5, a graph indicating the relationship between the subject distance difference dif and the number Num of images to be combined shifts in the direction of the subject distance difference dif in accordance with the closest distance d1. Accordingly, the contribution of the subject distance difference dif to the reduction in the number Num of images to be combined increases as the closest distance d1 decreases. In other words, the number Num of images to be combined decreases as the closest distance d1 decreases relative to the same subject distance difference dif. In the example in FIG. 5, variations in the threshold values difTH1 and difTH2 are equal to each other, and the graph has parallel-shifted. Alternatively, the variations in the threshold values difTH1 and difTH2 may be different from each other.

In a case where the closest distance d1 is large, as in a distant-view shooting mode, even if there is a subject distance difference dif to some extent, the difference between the amount of misalignment of the subject A at the front and the amount of misalignment of the subject B at the back is small enough that an artifact does not occur in the composite image. According to this embodiment, control is performed so as not to reduce the number of images to be combined if the closest distance d1 is large, thereby preventing a situation where the number of low-resolution images to be used for generating the composite image is reduced more than necessary.

In contrast, in a case where the closest distance d1 is small, as in a close-up shooting mode, an optical image of the subject A at the front shifts significantly on the imaging surface 4a due to slight motion of the imaging apparatus 10. As a result, the difference between the amount of misalignment of the subject A at the front and the amount of misalignment of the subject B at the back increases, thus resulting in a larger positional adjustment error in the low-resolution images.

According to this embodiment, when the closest distance d1 is small, the number of images to be combined is reduced even if the subject distance difference dif is small. Accordingly, a positional adjustment error in the low-resolution images due to the effect of the depth of the captured scene and an artifact in the composite image caused by the positional adjustment error can be suppressed, so that a composite image having few artifacts can be generated more reliably.

Third Embodiment

Next, an image processing device 1, an imaging apparatus 10, an image processing method, and an image processing program according to a third embodiment of the present invention will be described with reference to the drawings.

In this embodiment, components that are different from those in the first embodiment will be described, whereas components identical to those in the first embodiment will be given the same reference signs, and descriptions thereof will be omitted.

The image processing device 1 and the imaging apparatus 10 according to this embodiment are different from those in the first embodiment in that the number-of-images-to-be-combined setting unit 13 sets the number Num of images to be combined on the basis of a focal length of the optical system 3 in addition to the subject distance difference dif.

The focal length of the optical system 3 may be fixed. In this case, the number-of-images-to-be-combined setting unit 13 sets the number Num of images to be combined by using a preset focal length of the optical system 3.

The focal length of the optical system 3 may be variable. For example, a plurality of optical systems 3 with different focal lengths may be prepared, and the focal length may be changed by replacing the current optical system 3 to another one to be attached to the imaging apparatus 10. In this case, each optical system 3 is provided with a storage element, such as an IC tag, storing information about the focal length. The number-of-images-to-be-combined setting unit 13 acquires the information about the focal length from the storage element of the optical system 3 attached to the imaging apparatus 10. Alternatively, a main controller (not shown) that controls the overall operation of the imaging apparatus 10 may recognize the optical system 3 attached to the imaging apparatus 10, and the number-of-images-to-be-combined setting unit 13 may acquire the information about the focal length from the main controller.

As another alternative, the optical system 3 may be a zoom optical system with a variable focal length. In this case, for example, the number-of-images-to-be-combined setting unit 13 acquires the information about the focal length from the optical system 3 or the main controller.

Figure 6:
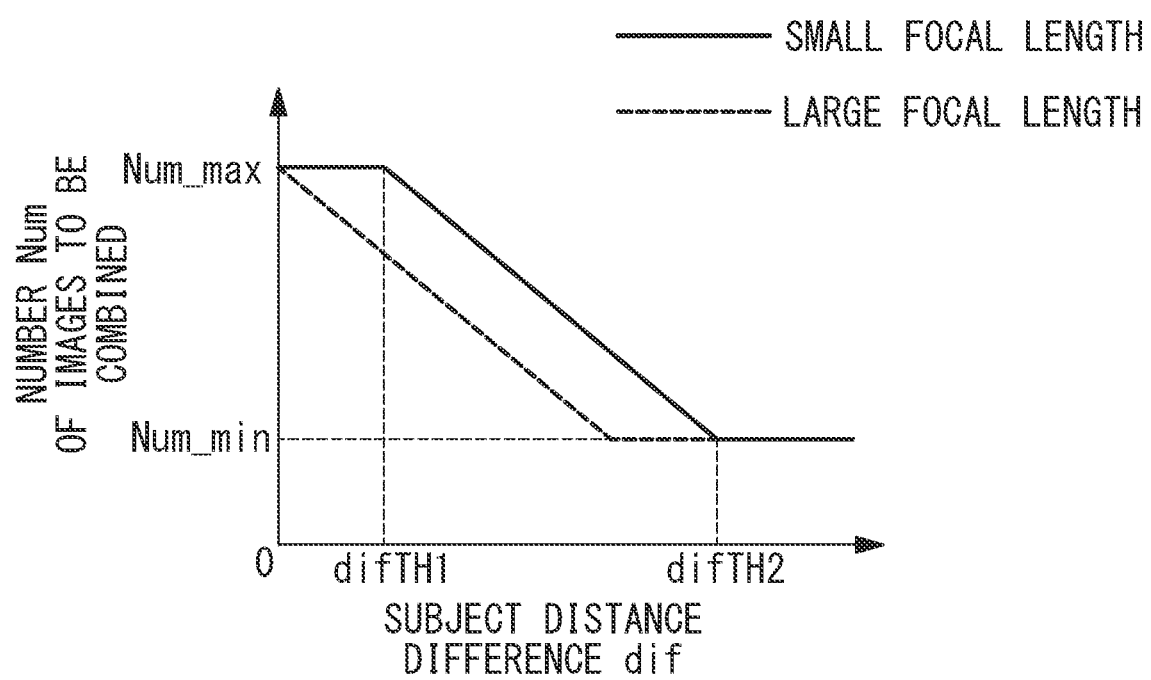
FIG. 6 illustrates an example of a method performed by a number-of-images-to-be-combined setting unit of an image processing device according to a third embodiment of the present invention for setting the number of images to be combined.

As shown in FIG. 6, the number-of-images-to-be-combined setting unit 13 controls the threshold values difTH1 and difTH2 for the subject distance difference dif in accordance with the focal length of the optical system 3, and reduces the threshold values difTH1 and difTH2 as the focal length increases. Specifically, in FIG. 6, a graph indicating the relationship between the subject distance difference dif and the number Num of images to be combined shifts in the direction of the subject distance difference dif in accordance with the focal length. Accordingly, the contribution of the subject distance difference dif to the reduction in the number Num of images to be combined increases as the focal length increases. In other words, the number Num of images to be combined decreases as the focal length increases relative to the same subject distance difference dif. In the example in FIG. 6, variations in the threshold values difTH1 and difTH2 are equal to each other, and the graph has parallel-shifted. Alternatively, the variations in the threshold values difTH1 and difTH2 may be different from each other.

Normally, as the focal length of the optical system 3 increases, the field angle of the optical system 3 decreases, and the shifting amount of an optical image of each of the subjects A and B on the imaging surface 4a during a continuous shooting mode increases. Therefore, in a case where the focal length of the optical system 3 is large, as in a telephotographic lens, the difference between the amount of misalignment of the subject A at the front and the amount of misalignment of the subject B at the back increases, thus resulting in a larger positional adjustment error in the low-resolution images.

According to this embodiment, when the focal length is large, the number of images to be combined is reduced even if the subject distance difference dif is small. Accordingly, a positional adjustment error in the low-resolution images due to the effect of the depth of the captured scene and an artifact in the composite image caused by the positional adjustment error can be suppressed, so that a composite image having few artifacts can be generated more reliably.

In contrast, in a case where the focal length of the optical system 3 is small, as in a wide-angle lens, the difference between the amount of misalignment of the subject A at the front and the amount of misalignment of the subject B at the back decreases, as compared with the case where the focal length is large. According to this embodiment, control is performed so as to not to reduce the number of images to be combined if the focal length is small, thereby preventing a situation where the number of low-resolution images to be used for generating a composite image is reduced more than necessary.

The following aspects can be also derived from the embodiments.

An aspect of the present invention provides an image processing device that combines a plurality of time-series images to generate a composite image with a higher resolution than a resolution of the plurality of images. The image processing device includes a depth-information detecting unit that detects depth information of at least one image of the plurality of images, and a number-of-images-to-be-combined setting unit that sets the number of images to be combined for generating the composite image on the basis of the depth information detected by the depth-information detecting unit. The depth information indicates a depth of a captured scene of the at least one image. The number-of-images-to-be-combined setting unit reduces the number of images as the depth of the captured scene increases.

According to this aspect, the depth-information detecting unit detects the depth information of the at least one image of the plurality of images, and the number-of-images-to-be-combined setting unit sets the number of images to be used for generating the composite image on the basis of the depth information.

If the captured scene of the images has depth, the amount of misalignment of each subject between the images varies from depth to depth, thus possibly causing an artifact to occur in the composite image. The artifact becomes more noticeable as the number of images to be combined increases.

In this aspect, the number of images to be used for generating the composite image is reduced as the depth of the captured scene increases. Consequently, a composite image having few artifacts can be generated even if the captured scene has depth.

In the above aspect, the depth-information detecting unit may detect, as the depth information, a subject distance difference indicating a difference between a closest distance and a farthest distance of the at least one image. The closest distance may be a subject distance to a closest subject of subjects in the at least one image. The farthest distance may be a subject distance to a farthest subject of the subjects in the at least one image.

According to this aspect, the depth of the captured scene of the images can be detected more accurately.

In the above aspect, the number-of-images-to-be-combined setting unit may set the number of images on the basis of the depth of the captured scene and a closest distance and increase a contribution of the depth of the captured scene to a reduction in the number of images as the closest distance decreases.

If the closest distance is small, an optical image of the closest subject shifts significantly on an imaging surface of an imaging apparatus due to slight motion of the imaging apparatus. Therefore, even if the depth of the captured scene is the same, the difference in the amount of misalignment of each subject from depth to depth increases as the closest distance decreases. With the above configuration, the contribution of the depth of the captured scene to the reduction in the number of images increases as the closest distance decreases. In other words, the number of images to be used for generating the composite image decreases as the closest distance decreases relative to the same depth of the captured scene. Consequently, a composite image having few artifacts can be generated even if the captured scene has depth.

In the above aspect, the number-of-images-to-be-combined setting unit may set the number of images on the basis of the depth of the captured scene and a focal length of an imaging apparatus that has acquired the plurality of time-series images, and increase a contribution of the depth of the captured scene to a reduction in the number of images as the focal length increases.

The difference in the amount of misalignment of each subject from depth to depth increases as the focal length of the imaging apparatus increases. With the above configuration, the contribution of the depth of the captured scene to the reduction in the number of images increases as the focal length increases. In other words, the number of images to be used for generating the composite image decreases as the focal length increases relative to the same depth of the captured scene. Consequently, a composite image having few artifacts can be generated even if the captured scene has depth.

Another aspect of the present invention provides an image processing method for combining a plurality of time-series images to generate a composite image with a higher resolution than a resolution of the plurality of images. The image processing method includes a step for detecting depth information of at least one image of the plurality of images, and a step for setting the number of images to be combined for generating the composite image on the basis of the detected depth information. The depth information indicates a depth of a captured scene of the at least one image. The step for setting the number of images includes reducing the number of images as the depth of the captured scene increases.

Another aspect of the present invention provides an image processing program for causing a processor to execute image processing for combining a plurality of time-series images to generate a composite image with a higher resolution than a resolution of the plurality of images. The image processing program causes the processor to execute a step for detecting depth information of at least one image of the plurality of images, and a step for setting the number of images to be combined for generating the composite image on the basis of the detected depth information. The depth information indicates a depth of a captured scene of the at least one image. The step for setting the number of images includes reducing the number of images as the depth of the captured scene increases.

REFERENCE SIGNS LIST 1 image processing device
2 image acquisition unit
3 optical system 4 imaging element
4a imaging surface
5 preprocessing unit
10 imaging apparatus
11 frame memory
12 depth-information detecting unit
13 number-of-images-to-be-combined setting unit
14 image combining unit
A, B subject
d1 closest distance
d2 farthest distance
dif subject distance difference (depth information)

The invention claimed is:

1. An image processing device that combines a plurality of time-series images to generate a composite image with a higher resolution than a resolution of the plurality of images, the image processing device comprising:
   a processor comprising hardware, the processor being configured to:
      detect depth information of at least one image of the plurality of images; and
      set a number of images to be combined for generating the composite image based on the detected depth information,
   wherein the depth information indicates a depth of a captured scene of the at least one image,
   wherein the processor is configured to reduce the number of images as the depth of the captured scene increases, and
   wherein the processor is configured to set the number of images based on the depth of the captured scene and a closest distance, and increase a contribution of the depth of the captured scene to a reduction in the number of images as a closest distance decreases, the closest distance being a subject distance to a closest subject of subjects in the at least one image.

2. The image processing device according to claim 1,
   wherein the processor is configured to detect, as the depth information, a subject distance difference indicating a difference between the closest distance and a farthest distance of the at least one image, and
   wherein the farthest distance is a subject distance to a farthest subject of the subjects in the at least one image.

3. An image processing device that combines a plurality of time-series images to generate a composite image with a higher resolution than a resolution of the plurality of images, the image processing device comprising:
   a processor comprising hardware, the processor being configured to:
      detect depth information of at least one image of the plurality of images; and
      set a number of images to be combined for generating the composite image based on the detected depth information,
   wherein the depth information indicates a depth of a captured scene of the at least one image,
   wherein the processor is configured to reduce the number of images as the depth of the captured scene increases, and
   wherein the processor is configured to set the number of images based on the depth of the captured scene and a focal length of an imaging apparatus that has acquired the plurality of time-series images, and increase a contribution of the depth of the captured scene to a reduction in the number of images as the focal length increases.

4. An image processing method for combining a plurality of time-series images to generate a composite image with a higher resolution than a resolution of the plurality of images, the image processing method comprising:
   detecting depth information of at least one image of the plurality of images; and
   setting a number of images to be combined for generating the composite image based on the detected depth information,
   wherein the depth information indicates a depth of a captured scene of the at least one image,
   wherein in the setting, the number of images is reduced as the depth of the captured scene increases, and
   wherein, in the setting, the number of images is set based on the depth of the captured scene and a closest distance, and a contribution of the depth of the captured scene to a reduction in the number of images is increased as a closest distance decreases, the closest distance being a subject distance to a closest subject of subjects in the at least one image.

5. A non-transitory computer-readable medium having an image processing program stored therein, the program being for causing a processor to execute image processing for combining a plurality of time-series images to generate a composite image with a higher resolution than a resolution of the plurality of images, the program causing the processor to execute functions of:
   detecting depth information of at least one image of the plurality of images; and
   setting a number of images to be combined for generating the composite image based on the detected depth information,
   wherein the depth information indicates a depth of a captured scene of the at least one image,
   wherein in the setting, the number of images is reduced as the depth of the captured scene increases, and
   wherein in the setting, the number of images is set based on the depth of the captured scene and a closest distance, and a contribution of the depth of the captured scene to a reduction in the number of images is increased as a closest distance decreases, the closest distance being a subject distance to a closest subject of subjects in the at least one image.

6. The image processing device according to claim 3,
   wherein the processor is configured to detect, as the depth information, a subject distance difference indicating a difference between a closest distance and a farthest distance of the at least one image,
   wherein the closest distance is a subject distance to a closest subject of subjects in the at least one image, and
   wherein the farthest distance is a subject distance to a farthest subject of the subjects in the at least one image.

7. The image processing method according to claim 4,
   wherein the detecting comprises detecting, as the depth information, a subject distance difference indicating a difference between the closest distance and a farthest distance of the at least one image, and
   wherein the farthest distance is a subject distance to a farthest subject of the subjects in the at least one image.

8. The non-transitory computer-readable medium according to claim 5,
   wherein the detecting comprises detecting, as the depth information, a subject distance difference indicating a difference between the closest distance and a farthest distance of the at least one image, and
   wherein the farthest distance is a subject distance to a farthest subject of the subjects in the at least one image.

9. An image processing method for combining a plurality of time-series images to generate a composite image with a higher resolution than a resolution of the plurality of images, the image processing method comprising:
  detecting depth information of at least one image of the plurality of images; and
  setting a number of images to be combined for generating the composite image based on the detected depth information,
  wherein the depth information indicates a depth of a captured scene of the at least one image,
  wherein in the setting, the number of images is reduced as the depth of the captured scene increase,
  wherein in the setting, the number of images is set based on the depth of the captured scene and a focal length of an imaging apparatus that has acquired the plurality of time-series images, and a contribution of the depth of the captured scene to a reduction in the number of images is increased as the focal length increases.

10. The image processing method according to claim 9,
  wherein the detecting comprises detecting, as the depth information, a subject distance difference indicating a difference between a closest distance and a farthest distance of the at least one image,
  wherein the closest distance is a subject distance to a closest subject of subjects in the at least one image, and
  wherein the farthest distance is a subject distance to a farthest subject of the subjects in the at least one image.

11. A non-transitory computer-readable medium having an image processing program stored therein, the program being for causing a processor to execute image processing for combining a plurality of time-series images to generate a composite image with a higher resolution than a resolution of the plurality of images, the program causing the processor to execute functions of:
  detecting depth information of at least one image of the plurality of images; and
  setting a number of images to be combined for generating the composite image based on the detected depth information,
  wherein the depth information indicates a depth of a captured scene of the at least one image,
  wherein in the setting, the number of images is reduced as the depth of the captured scene increases, and
  wherein in the setting, the number of images is set based on the depth of the captured scene and a focal length of an imaging apparatus that has acquired the plurality of time-series images, and a contribution of the depth of the captured scene to a reduction in the number of images is increased as the focal length increases.

12. The non-transitory computer-readable medium according to claim 11,
  wherein the detecting comprises detecting, as the depth information, a subject distance difference indicating a difference between a closest distance and a farthest distance of the at least one image,
  wherein the closest distance is a subject distance to a closest subject of subjects in the at least one image, and
  wherein the farthest distance is a subject distance to a farthest subject of the subjects in the at least one image.

* * * * *